(12) United States Patent
Murakami et al.

(10) Patent No.: US 8,193,677 B2
(45) Date of Patent: Jun. 5, 2012

(54) BRUSHLESS MOTOR AND ELECTRIC POWER STEERING APPARATUS HAVING EXPOSED BUS BAR

(75) Inventors: Toshiaki Murakami, Nagoya (JP); Tomohiro Niwa, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 521 days.

(21) Appl. No.: 12/199,033

(22) Filed: Aug. 27, 2008

(65) Prior Publication Data
US 2009/0058215 A1 Mar. 5, 2009

(30) Foreign Application Priority Data
Aug. 30, 2007 (JP) .................................. 2007-224186

(51) Int. Cl.
*H02K 3/04* (2006.01)
*H02K 3/34* (2006.01)
*H02K 23/26* (2006.01)
*H02K 27/02* (2006.01)

(52) U.S. Cl. ............................ 310/208; 310/71; 310/195
(58) Field of Classification Search .................. 310/208, 310/215, 52, 64, 71, 195, 201, 202, 203, 310/204, 205, 206, 207, 214; *H02K 3/04, H02K 3/34, 23/26, 27/02*
See application file for complete search history.

(56) References Cited

U.S. PATENT DOCUMENTS

| | | | | |
|---|---|---|---|---|
| 5,828,147 A * | 10/1998 | Best et al. | ........................ | 310/71 |
| 7,219,417 B2 * | 5/2007 | Kobayashi et al. | ............. | 310/71 |
| 2003/0094879 A1 * | 5/2003 | Kobayashi et al. | ........... | 310/238 |
| 2006/0043806 A1 * | 3/2006 | Torii et al. | ........................ | 310/71 |
| 2006/0138883 A1 * | 6/2006 | Yagai et al. | ..................... | 310/71 |
| 2007/0232094 A1 * | 10/2007 | Hoshika | ...................... | 439/76.2 |
| 2007/0278876 A1 * | 12/2007 | Haga et al. | ...................... | 310/71 |

FOREIGN PATENT DOCUMENTS
JP 2006-296147 10/2006
* cited by examiner

*Primary Examiner* — Quyen Leung
*Assistant Examiner* — Michael Andrews
(74) *Attorney, Agent, or Firm* — Oblon, Spivak, McClelland, Maier & Neustadt, L.L.P.

(57) ABSTRACT

A motor includes a cylindrical stator. The stator includes a stator core having teeth, which project inwardly in the radial direction, and coils, which are formed by winding a conductive wire onto each tooth with first and second insulators. The first insulator includes a support extending axially from an outer restriction wall. Each of first to third bus bars is supported by the support of the first insulator in a state in which a main portion is exposed. The main portions of the first to third bus bars are thus in contact with ambient air.

13 Claims, 4 Drawing Sheets

BRUSHLESS MOTOR AND ELECTRIC POWER STEERING APPARATUS HAVING EXPOSED BUS BAR

CROSS-REFERENCE TO RELATED APPLICATIONS

This application is based upon and claims the benefit of priority from prior Japanese Patent Application No. 2007-224186, filed on Aug. 30, 2007, the entire contents of which are incorporated herein by reference.

BACKGROUND OF THE INVENTION

The present invention relates to a brushless motor, and more particularly, to a brushless motor including an improved bus bar and an electric power steering apparatus using such a motor.

An electric power steering (EPS) apparatus using a motor as a drive source is nowadays often used as a vehicle power steering device. Such an EPS uses a brushless motor including a stator core, which has teeth extending radially inward, and a coil, which is formed by winding a conductive wire onto each tooth. Japanese Laid-Open Patent Publication No. 2006-296147 describes a prior art example of a brushless motor. In such a motor, an independent conductive wire is wound on each tooth to form a coil. The motor includes a bus bar for connecting ends of the coil supplied with current of the same phase and for supplying each coil with current from an external device.

In the above-described motor, the bus bar is arranged in a housing in a state embedded in a bus bar holder formed from a resin. Resin usually has low thermal conductivity. Thus, when current flows though a coil and generates heat, the bus holder that is arranged in the housing makes it difficult to radiate the heat out of the housing. Furthermore, an increase in the temperature of the coil increases the electrical resistance of the coil. This increases voltage drop at the coil, which in turn may lower output of the motor. In such a case, the EPS cannot apply an appropriate assist force to a steering system when sudden steering (high-speed steering) operations are performed. This may result in an uncomfortable steering feel.

SUMMARY OF THE INVENTION

It is an object of the present invention to provide a brushless motor having improved heat radiation characteristics and an electric power steering using such a brushless motor.

One aspect of the present invention is a three-phase brushless motor including a cylindrical housing extending in an axial direction of the motor. A cylindrical stator is arranged in the housing. The stator includes a stator core having a plurality of teeth projecting radially inwardly therefrom. A plurality of coils are each wound about an associated one of the teeth and have an end. An insulator is arranged between each tooth and associated coil and electrically insulates the tooth from the associated coil. A plurality of bus bars electrically connect the ends of the plurality of coils supplied with an external current having the same phase. Each of the bus bars includes a main portion and a connection portion, in which the main portion extends in a circumferential direction. The connection portion is arranged at a predetermined position on the main portion and connected to the end of an associated one of the coils. The insulator includes a support which supports at least one of the bus bars in a state in which the main portion of the bus bar is exposed.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of a column-type electric power steering (EPS) apparatus 1 according to the present invention will now be described with reference to the drawings.

Figure 1:
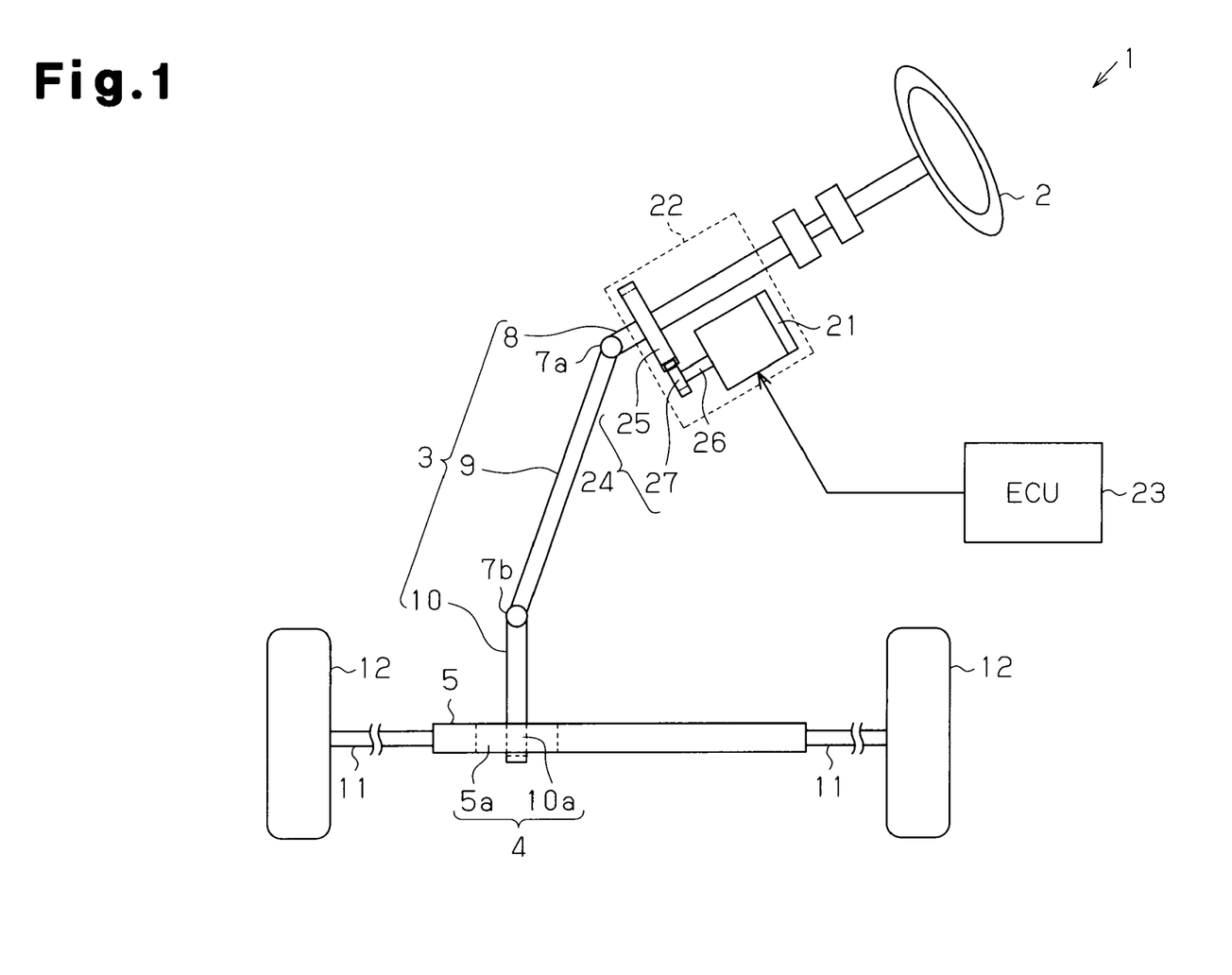
FIG. 1 is a schematic diagram showing an electric power steering device.

Referring to FIG. 1, the EPS apparatus 1 includes a steering wheel 2 fixed to a steering shaft 3, which is connected by a rack-and-pinion mechanism 4 to a rack shaft 5. Rotation of the steering shaft 3 during a steering operation is converted to linear reciprocating movements of the rack shaft 5 by the rack-and-pinion mechanism 4. Specifically, the steering shaft 3 includes a column shaft 8, an intermediate shaft 9, and a pinion shaft 10, which are coupled together by universal joints 7a and 7b. Pinion teeth 10a are formed at one end of the pinion shaft 10, and rack teeth 5a are formed on the rack shaft 5. The rack-and-pinion mechanism 4 is formed by the mating of the pinion teeth 10a with the rack teeth 5a. When the steering shaft 3 is rotated, the linear reciprocating movements of the rack shaft 5 are transmitted to knuckles (not shown) by tie rods 11 coupled to the two ends of the rack shaft 5. This changes the steering angle of steered wheels 12, that is, the travel direction of the vehicle.

The EPS apparatus 1 includes an EPS actuator 22 and an electronic control unit (ECU) 23. The EPS actuator 22 applies assist force to the steering system so as to assist steering operations, and the ECU 23 controls the operation of the EPS actuator 22. The EPS actuator 22 includes a motor 21, which functions as a drive source that generates the assist force for rotating the steering shaft 3.

Specifically, the EPS actuator 22 is a so-called column-type EPS actuator for applying assist force to the column shaft 8. The motor 21 includes a rotatable motor shaft 26, which is coupled to the column shaft 8 by a reduction mechanism 24 so that the motor shaft 26 can drive the column shaft 8. The reduction mechanism 24 includes a reduction gear 25 fixed to the column shaft 8 and a motor gear 27 fixed to the motor shaft 26. The gears 25 and 27 are mated with each other. Therefore, rotation produced by the motor 21 is reduced by the reduction mechanism 24 and transmitted to the column shaft 8. The EPS actuator 22 applies the motor torque thereof on the steering system as the assist force. A so-called worm and wheel is used as the reduction mechanism 24 in the preferred embodiment.

The ECU 23 supplies the motor 21 with drive power to control the rotation produced by the motor 21, that is, the operation of the EPS actuator 22.

Figure 2:
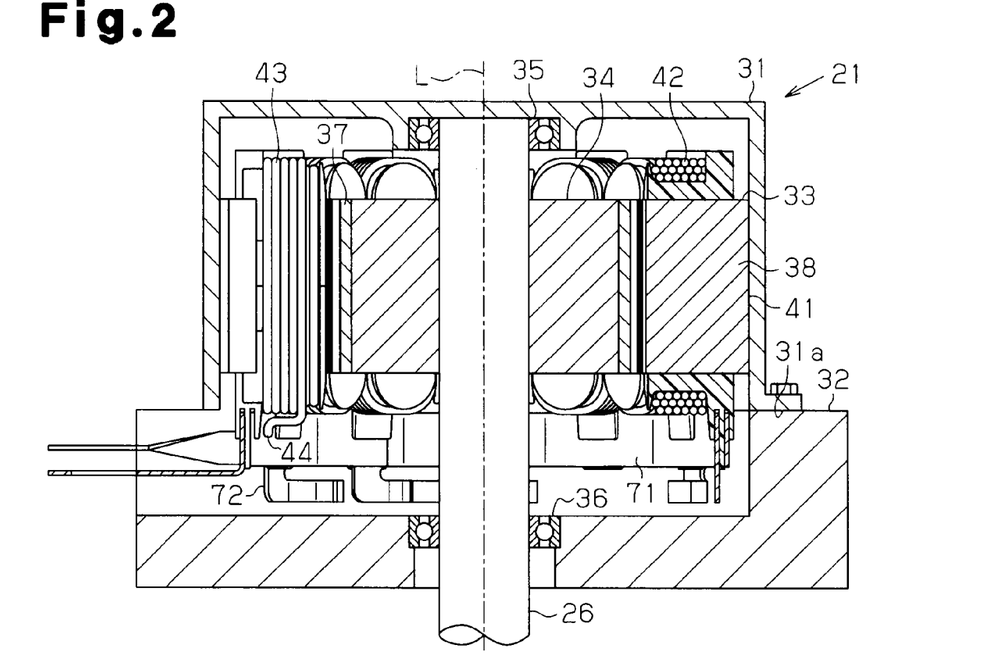
FIG. 2 is a cross-sectional view showing a motor of FIG. 1.

The structure of the motor 21 will now be described with reference to FIGS. 2 to 7. The upper and lower sides as viewed in FIGS. 2 and 4 are defined here as the upper and lower sides of the motor 21. The motor 21 is a three-phase brushless motor having a field permanent magnet arranged on a rotor.

As shown in FIG. 2, the motor 21 includes a cylindrical housing 31 and a cylindrical end frame 32, which is fixed to the housing 31. The upper side of the housing 31 is closed, and the lower side of the housing 31 defines an opening 31a. The end frame 32 is fixed to the housing 31 so as to close the opening 31a of the housing 31. In the preferred embodiment, the housing 31 is formed from a metal material having high thermal conductivity (e.g., aluminum alloy). A cylindrical stator 33 is fixed to an inner surface of the housing 31. A rotor 34 is fixed to the motor shaft 26 and rotatably supported in the stator 33 by bearings 35 and 36, which are arranged at the upper central part of the housing 31 and the central part of the end frame 32. A ring magnet 37 facing the stator 33 is fixed to an outer surface of the rotor 34. The ring magnet 37 has plural magnetic poles (ten in the preferred embodiment) arranged along the circumferential direction.

Figure 3:
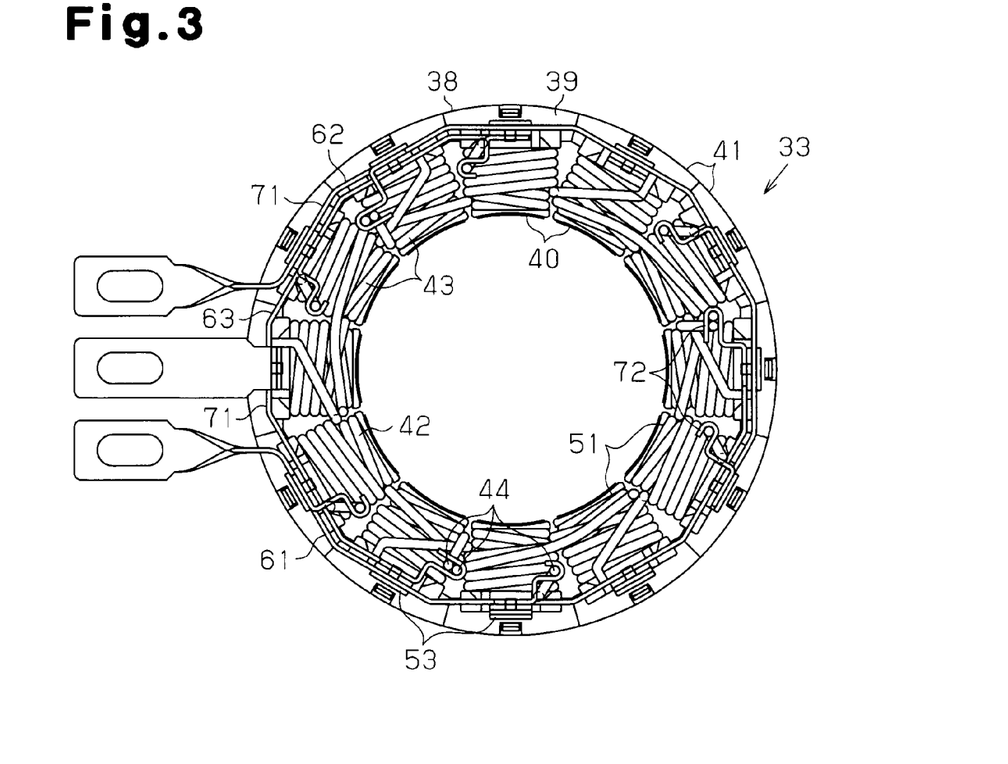
FIG. 3 is a bottom view showing a stator of FIG. 2.
Figure 4:
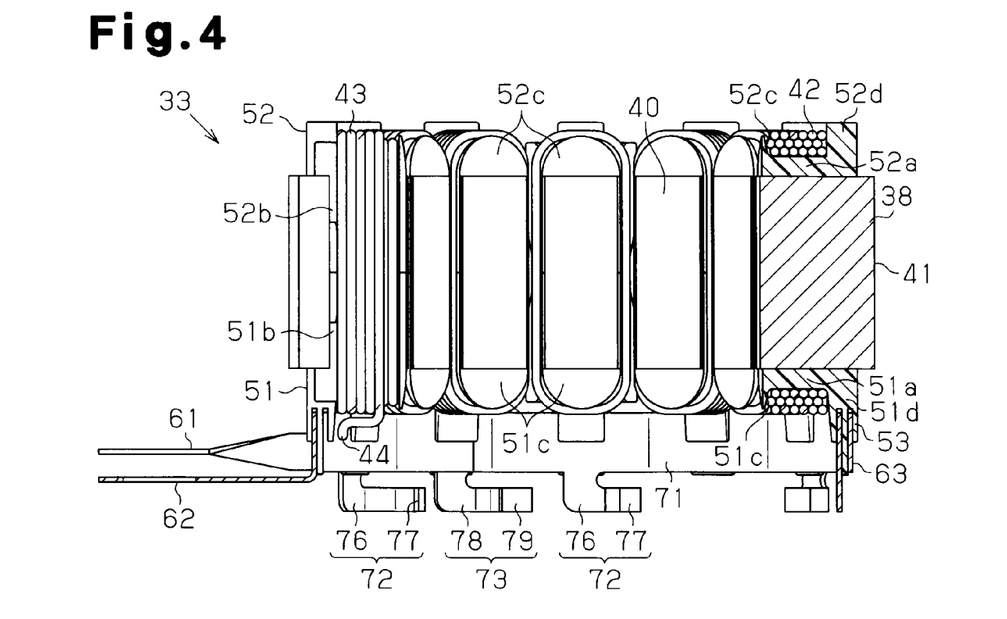
FIG. 4 is a cross-sectional view showing the stator of FIG. 2.

As shown in FIG. 3, the stator 33 includes a stator core 38. The stator core 38 includes a cylinder 39 and teeth 40, which project radially inward from the cylinder 39. The stator core 38 further includes a plurality of (twelve in the preferred embodiment) core segments 41 arranged in the circumferential direction, with each core segment 41 including one of the teeth 40. Each core segment 41 is formed by stacking a plurality of core sheets (not shown). Each core sheet is obtained by punching out a magnetic metal plate.

As shown in FIG. 4, a first insulator 51 and a second insulator 52, which form a pair, is attached to each core segment 41. Specifically, each first insulator 51 is attached to the corresponding core segment 41 from the lower side of the motor 21, and each second insulator 52 is attached to the corresponding core segment 41 from the upper side of the motor 21. The first and second insulators 51, 52 are made of resin having electrical insulation characteristics.

Figure 5A:
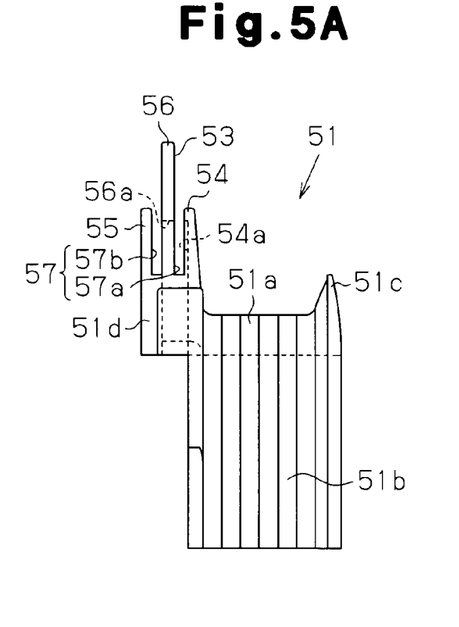
FIG. 5A is a side view showing a first insulator.
Figure 5B:
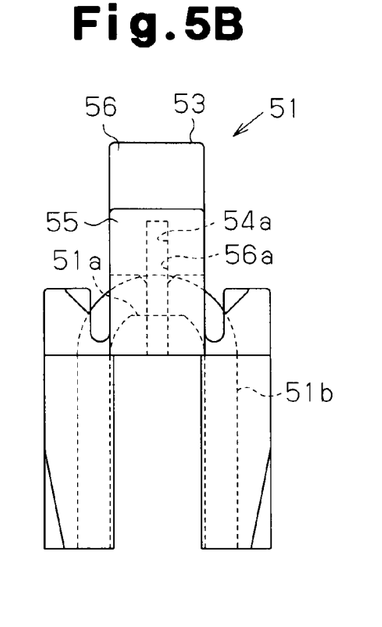
FIG. 5B is a front view showing the first insulator.

As shown in FIGS. 4, 5A, and 5B, each first insulator 51 includes an end face cover 51a and two plate-shaped side surface covers 51b, which are integrally formed with the end face cover 51a and extend from two sides of the end face cover 51a. The end face cover 51a covers the lower end face of the corresponding core segment 41 and tooth 40. The side surface covers 51b cover the lower half of the two side surfaces of the corresponding tooth 40. Each first insulator 51 further includes an inner restriction wall 51c and an outer restriction wall 51d. The inner restriction wall 51c is formed integrally with a radially inward end of the end face cover 51a and extends to the lower side of the motor 21. The outer restriction wall 51d is formed integrally with a radially outward end of the end face cover 51a and extends in the axial direction.

As shown in FIG. 4, in the same manner as the first insulator 51, each second insulator 52 has an end face cover 52a and two plate-shaped side surface covers 52b, which are formed integrally with the end face cover 52a and extend from two sides of the end face cover 52a. The end face cover 52a covers the upper end face of the corresponding core segment 41 and tooth 40. The side surface covers 52b cover the upper half of the two side surfaces of the corresponding tooth 40. Each second insulator 52 further includes an inner restriction wall 52c and an outer restriction wall 52d. The inner restriction wall 52c is formed integrally with a radially inward end of the end face cover 52a and extends to the upper side of the motor 21. The outer restriction wall 52d is formed integrally with a radially outward end of the end face cover 52a and extends in the axial direction.

Referring again to FIG. 3, twelve coils 43 are formed by winding the conductive wire 42 onto the first and second insulators 51 and 52, which are attached to each tooth 40 of the stator core 38, so as to form a concentrated winding. The inner restriction walls 51c and 52c restrict radially inward overhanging of the associated coil 43. The outer restriction walls 51d and 52d restrict radially outward overhanging of the associated coil 43. The conductive wire 42 forming each coil 43 is coated by an insulative coating film. However, the insulative coating film is removed from predetermined regions at the ends 44 of each coil 43. The stator 33 is shrink-fitted and fixed to the inner surface of the housing 31.

The first insulator 51 will be now described below in detail with reference to FIGS. 5A and 5B.

Figures 6A, 6B:
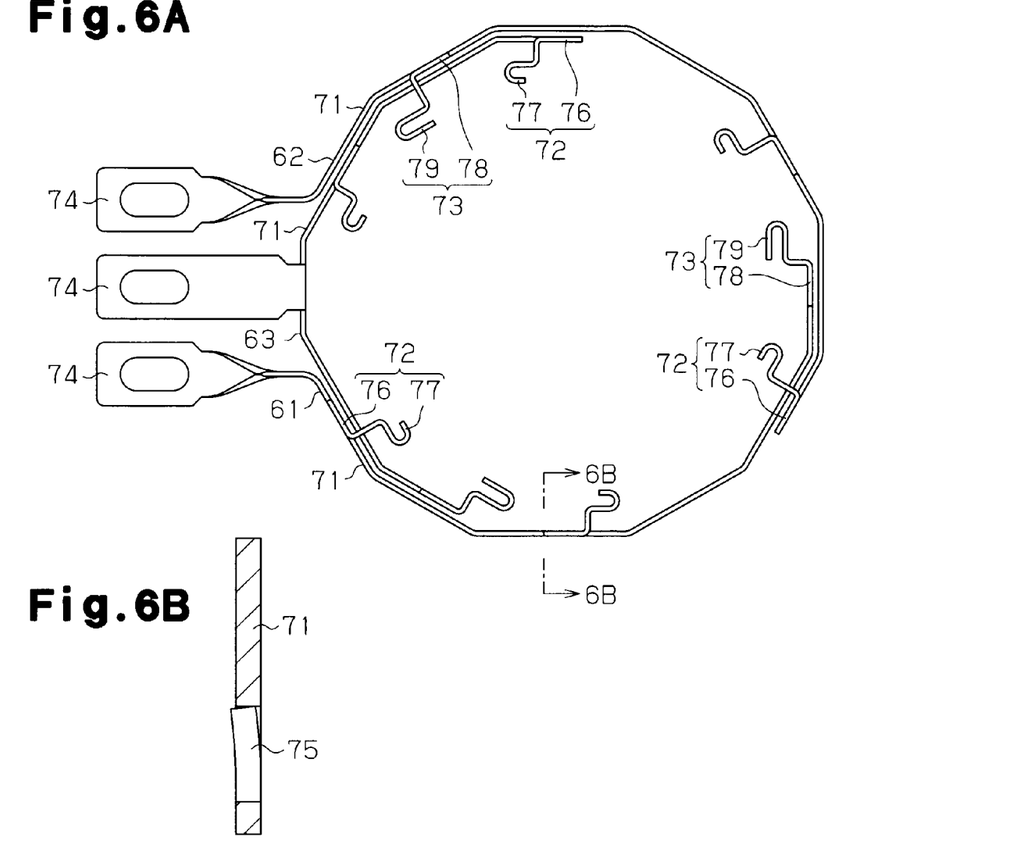
FIG. 6A is a bottom view showing a bus bar.
FIG. 6B is a cross-sectional view taken along line 6B-6B of FIG. 6A.

As shown in FIGS. 5A and 5B, each first insulator 51 includes a support 53 formed on the outer restriction wall 51d and extending in the axial direction. The support 53 supports first to third arcuate bus bars 61 to 63 (FIGS. 3, 4, 6). The first to third bus bars 61 to 63 each connect the ends 44 of the coils 43 that are supplied with current of the same phase. Each support 53 includes an inner wall 54, an outer wall 55, and a partition wall 56. The inner and outer walls 54 and 55 are arranged at opposite sides of the partition wall 56 in the radial direction. Further, the inner wall 54 and the outer wall 55 are spaced from the partition wall 56 by predetermined intervals. The inner wall 54, the outer wall 55, and the partition wall 56 form a holding slot 57 extending along the circumferential direction. The holding slot 57 has an opening at the distal side (upper side as viewed in FIG. 5A) of the support 53. In the preferred embodiment, the holding slot 57 is formed by two concentric grooves including an inner groove 57a, which is formed at the radially inward side, and an outer groove 57b, which is formed on the radially outward side.

An engagement cavity 56a, which serves as a recess, is formed in the radially inner side of the outer groove 57b, that is, in the middle of the partition wall 56. The engagement cavity 56a extends in the axial direction from the lower end of the outer restriction wall 51d (upper side of the motor 21) to the middle of the partition wall 56 and extends through the partition wall 56 in the radial direction. An engagement groove 54a, which serves as a recess, is formed in the radially inner side of the inner groove 57a, that is, in the middle of the inner wall 54. The engagement groove 54a extends in the axial direction from the lower end of the outer restriction wall 51d (upper side of motor 21) to the vicinity of the distal end of the inner wall 54. The engagement cavity 56a and the engagement groove 54a face each other.

The first to third bus bars 61 to 63 will now be described.

As shown in FIG. 6A, the first to third bus bars 61 to 63 each include a main portion 71 and first and second connection portions 72 and 73. The main portion 71 is formed from a strip of a conductive plate material. The first and second connection portions 72 and 73 are formed integrally with the main portion 71. The main portion 71 is bent so that a plurality of straight portions extend along an arc. The main portion 71 is supported by the first insulators 51 (FIG. 3) in a state in which the widthwise direction of the main portion 71 is parallel to an axis L (FIG. 2).

As shown in FIG. 6A, the first bus bar 61 includes the main portion 71, which is arcuate and extends along the circumferential direction at a lower side as viewed in FIG. 6A, and a terminal 74, which is arranged at the basal end of the main portion 71. The second bus bar 62 includes the main portion 71, which is arcuate and extends along the circumferential direction, and a terminal 74, which is arranged at the basal end of the main portion 71. The third bus bar 63 includes the main portion 71, which is arcuate and extends along the circumferential direction, and a terminal 74, which is arranged at an intermediate portion in the circumferential direction of the main portion 71. The main portions 71 of the first to third bus bars 61, 62, and 63 are spaced at intervals from one another in the radial direction. The main portions 71 are each arranged in correspondence with the locations of the ends 44 of the corresponding coil 43 (see FIG. 3). Current is supplied to each coil 43 (see FIG. 3) by electrically connecting the terminal 74 to the ECU 23, which is located outside the motor 21.

As shown in FIG. 4, the main portion 71 of each of the first to third bus bars 61 to 63 are held in the corresponding inner grooves 57a or outer grooves 57b of the first insulators 51. The first to third bus bars 61 to 63 are thus supported by the first insulators 51 in a state in which the main portions 71 are exposed. Specifically, the main portion 71 of the first bus bar 61 has a basal side held in the outer grooves 57b and a distal side held in the inner grooves 57a, as shown in FIG. 3. The main portion 71 of the second bus bar 62 is entirely held in the outer groove 57b. The first and second bus bars 61 and 62 have distal portions that are overlapped with each other in the radial direction. The main portion 71 of the third bus bar 63 is entirely held in the inner grooves 57a and overlaps the main portions 71 of the first and second bus bars 61 and 62 in the radial direction.

As shown in FIG. 6B, each main portion 71 includes a plurality of stoppers 75 formed at locations corresponding to the inner grooves 57a and the outer grooves 57b. Each stopper 75 is inclined by a predetermined angle with respect to the axial direction and projected radially inward (leftward as viewed in FIG. 6B). In the preferred embodiment, the stopper 75 is formed by performing cut and erection in which the main portion 71 is cut out and bent. The stoppers 75 are formed at three locations in each main portion 71. At the part of the main portion 71 held in the outer grooves 57b of the first insulators 51, each stopper 75 is fitted into the corresponding engagement cavity 56a. At the part of the main portion 71 held in the inner grooves 57a, each stopper 75 is fitted into the corresponding engagement groove 54a.

As shown in FIG. 6A, the first connection portions 72 are arranged at predetermined positions (two locations in each main portion 71 in the preferred embodiment) in the circumferential direction for each main portion 71. The second connection portion 73 is arranged at a predetermined position (one location in each main portion 71 in the preferred embodiment) in the circumferential direction for each main portion 71. Each first connection portion 72 is connected to one end 44 of the corresponding coil 43. Each second connection portion 73 is connected to two ends 44 of the two corresponding coils 43. The first connection portion 72 each includes a first extension 76 (see FIG. 4), which extends to the lower side of the motor 21 from the main portion 71, and a first holder 77, which extends radially inward from the first extension 76. In the same manner, the second connection portion 73 includes a second extension 78 (see FIG. 4), which extends to the lower side of the motor 21 from the main portion 71, and a second holder 79, which extends radially inward from the second extension 78. The first and second connection portions 72 and 73 arranged in each main portion 71 are arranged so that they do not overlap one another in the circumferential direction.

In the preferred embodiment, the first and second holders 77 and 79 extend along the circumferential direction and have a hook-shaped distal end. Specifically, the first and second holders 77 and 79 each have a distal portion that is bent back along an arc so as to form an opening along the circumferential direction. The first and second holders 77 and 79 arranged in the main portion 71 and supported by the outer grooves 57b are arranged radially inward from the inner groove 57a. Furthermore, the first and second holders 77 and 79 are arranged along the same circle. As shown in FIG. 3, the second holder 79 has a circumferential length that is longer than that of the first holder 77 to hold two ends 44. The ends 44 of each coil 43 are held in the predetermined ones of first and second holders 77 and 79. Further, the first and second holders 77 and 79 and the ends 44 of the coils 43 are electrically connected through resistance welding.

Figure 7:
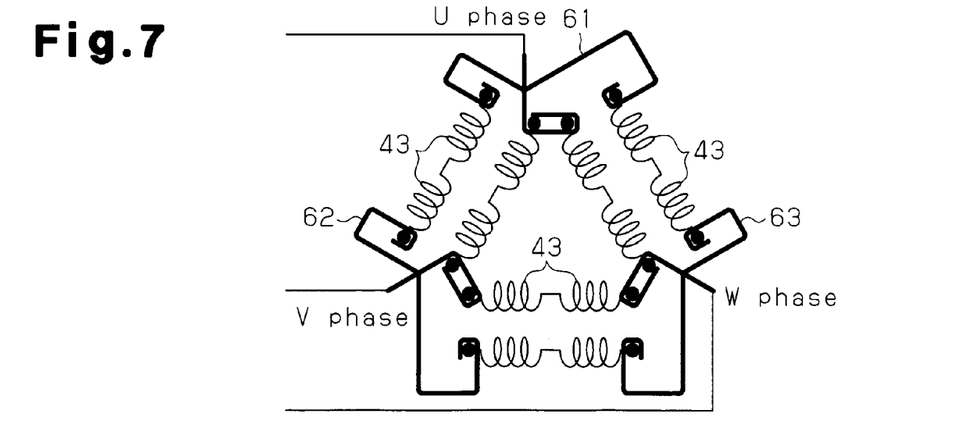
FIG. 7 is a schematic diagram showing coil connections.

As shown in FIG. 7, in the preferred embodiment, the ends 44 of the coils 43 supplied with U-phase current are connected to one another by the first bus bar 61. The ends 44 of the coils 43 supplied with V-phase current are connected to one another by the second bus bar 62. The ends 44 of the coils 43 supplied with W-phase current are connected to one another by the third bus bar 63. The two associated coils 43 connected by each of the first to third bus bars 61 to 63 are connected in series by a connection line so that the two connected coils 43 form a continuous winding. Further, two continuous windings are connected in parallel. In other words, six of the twelve coils 43 form continuous windings are formed, and two sets of three continuous windings are delta-connected with the first to third bus bars 61 to 63 to form a double delta connection (parallel delta connection).

Referring to FIG. 2, a rotary magnetic field is formed around the ring magnet 37 by supplying a three-phase alternating current to each coil 43. The rotary magnetic field and field magnetic flux generated by the ring magnet 37 cooperate to rotate the rotor 34 and thereby drive the motor 21.

In the preferred embodiment, the motor 21 has the advantages described below.

(1) The motor 21 includes the stator 33, which is formed by the stator core 38 having the teeth 40, which project radially inward, and the coils 43, each formed by winding the conductive wire 42 onto the corresponding tooth 40 with the first and second insulators 51 and 52. The first insulators 51 each include the support 53 extending in the axial direction from the axial end of the outer restriction wall 51d. The support 53 supports the first to third bus bars 61 to 63 in a state in which the main portions 71 are exposed. The main portions 71 of the first to third bus bars 61 to 63 are thus in contact with ambient air. Thus, the main portions 71 are in direct contact with the ambient air, whereas a bus bar for a prior art motor is embedded in the resin bus bar holder Japanese Laid-Open Patent Publication No. 2006-296147). Therefore, the heat generated when the current flows through the coil 43 is easily radiated from the first to third bus bars 61 to 63. Since exclusive a bus bar holder does not need to be arranged in the housing 31, the heat generated by the coils 43 is easily radiated and released outside. This improves the heat radiation characteristics of the motor 21.

(2) The support 53 extends in the axial direction from each outer restriction wall 51d. This avoids enlargement of the motor 21 in the radial direction.

(3) The main portion 71 in each of the first to third bus bars 61 to 63 is strip-shaped. Further, in the support 53, the distal side of the outer restriction wall 51d includes an opening, and the inner groove 57a and the outer groove 57b extend along the circumferential direction. Thus, the first to third bus bars 61 to 63 are easily supported by the first insulator 51 by holding the strip-shaped main portions 71 with the inner grooves 57a and the outer grooves 57b. This facilitates the attachment of the first to third bus bars 61 to 63.

(4) The stoppers 75 are each formed by cutting out the main portion 71 and bending the cut portion, which is fitted into the corresponding engagement cavity 56a or engagement groove 54a of the first insulator 51. This easily fastens the first to third bus bars 61 to 63 to the first insulator 51.

(5) The inner grooves 57a and outer grooves 57b are formed in two rows in the radial direction of the support 53. Compared to when forming three or more rows of holding slots in the radial direction, a longer radial distance between bus bars can be provided. This facilitates the radiation of heat from the first to third bus bars 61 to 63 and improves the heat radiation characteristics of the motor 21.

(6) The main portion 71 of the first bus bar 61 has a basal side held in the outer grooves 57b and a distal side held in the inner grooves 57a. In this manner, a single bus bar is supported along different circumferences (i.e., along the inner grooves 57a and the outer grooves 57b). Thus, at least three bus bars that are required to supply three-phase current is supported along two rows in the radial direction by the inner and outer grooves 57a and 57b.

(7) The first and second holders 77 and 79 are open in the circumferential direction. The openings facilitate insertion of the ends 44 of the coils 43 into the first and second holders 77 and 79. This enables the conductive wires 42 to be easily connected to the first to third bus bars 61 to 63.

(8) The two ends 44 of a coil 43 are connected to each second connection portion 73. This reduces the procedures required to connect the ends 44 of the coil 43 compared to when connecting only one end 44 of the coil 43.

(9) The first and second holders 77 and 79 that corresponding to a main portion 71 supported by the outer grooves 57b are arranged radially inward from the inner grooves 57a. Thus, the ends 44 of the coils 43 held by the first and second holders 77 and 79 corresponding to the outer grooves 57b do not contact radially inward sides of bus bars. This improves the reliability of the motor 21.

(10) The first and second holders 77 and 79 are arranged along the same circle. Thus, when rotating the stator 33, the first and second holders 77 and 79 pass by the same location. This facilitates automation for connecting the ends 44 of the coils 43 to the first and second holders 77 and 79.

(11) The ends 44 of the coils 43 are connected to the first and second connection portions 72 and 73 of the first to third bus bars 61 to 63 through resistance welding. This increases the mechanical strength of the connection portions increases and improves temperature-related durability compared to when connecting the ends 44 of the coils 43 to the first and second connection portions 72 and 73 of the first to third bus bars 61 to 63 through soldering.

(12) The stator 33 includes the plurality of core segments 41. This facilitates the winding of the conductive wires 42 to the teeth 40 and improves the space factor of the coil 43 (proportion of the conductive wire 42 occupying the cross-section of the coil 43) thereby increasing the output of the motor 21.

(13) The plurality of coils 43 are delta-connected. Thus, a bus bar for connecting each coil 43 to a neutral point, as in a star connection, is unnecessary. Therefore, the number of bus bars supported by the first insulator 51 is less than a star connection. A small number of bus bars are arranged in the radial direction, and a long radial distance can be provided between the first to third bus bars 61 to 63. This easily radiates heat from the first to third bus bars 61 to 63. This improves the heat radiation characteristics of the motor 21.

(14) The electrical resistance of the coils 43 is reduced since the coils 43 are connected in parallel between the first to third bus bars 61 to 63. Thus, the current flowing to each coil 43 increases and enable the motor 21 to produce high-speed rotation compared to when the coils 43 are connected in series for each of the phases U, V, and W.

(15) The housing 31 is formed from a metal material having high thermal conductivity. Thus, the heat generated by the coils 43 is effectively released out of the stator 33 and the housing 31. This improves the heat radiation characteristics of the motor 21.

(16) Improvement in the heat radiation characteristics of the motor 21 suppresses temperature increases in the coils 43 wound around the teeth 40. Thus, the electrical resistance of the conductive wires 42 is prevented from being increased, and voltage drops in the conductive wire 42 are suppressed. Therefore, the motor 21 applies appropriate assist torque to the steering system even when performing sudden steering (high-speed steering) operations. This improves the steering feel during sudden steering operations.

The motor 21 of the preferred embodiment may be modified in the following forms.

To fasten the first to third bus bars 61 to 63 to the first insulators 51, the main portions 71 include the stoppers 75, and the support 53 of each first insulator 51 includes the engagement cavity 56a or the engagement groove 54a, which serves as a recess. However, other structures may be employed to fasten the first to third bus bars 61 to 63 to the first insulators 51. Either one of an engagement projection and an engagement recess may be formed in the main portion 71, and the other one of the engagement projection and the engagement recess may be formed in the support 53. Such a structure also fastens the main portions 71 to the supports 53.

In the preferred embodiment, the engagement groove 54a, to which the stopper 75 is fitted, is formed in the inner groove 57a. However, instead of the engagement groove 54a, an engagement groove may be formed at the outer side of the outer groove 57b, that is, in the outer wall 55. In this case, the stopper 75 is formed extending radially outward to be fitted and fastened to the engagement groove at the outer side of the outer groove 57b.

In the preferred embodiment, the stopper 75 of the main portion 71 is fitted to the engagement cavity 56a or the engagement groove 54a of the support 53 to fasten the first to third bus bars 61 to 63 to the first insulator 51. Instead, the inner grooves 57a and the outer grooves 57b may be formed to have a depth that is the same as the width of the main portions 71 so that the main portions 71 can be completely accommodated in the inner grooves 57a and the outer grooves 57b. Further, a flange extending in the radial direction may be formed at the distal end of the partition walls 56 to close the openings of the inner grooves 57a and the outer grooves 57b. This fastens the first to third bus bars 61 to 63 held in the inner grooves 57a and the outer grooves 57b.

Each main portion 71 is bent to be generally arcuate. However, the main portion may be curved along the circumferential direction to be truly arcuate.

The support 53 is arranged on the outer side of each first insulator 51. Instead, the support may be arranged on the inner side of each first insulator 51. Specifically, the support 53 extends in the axial direction from the outer restriction wall 51d but may be arranged instead so to extend in the axial direction from the inner restriction wall 51c.

Two coils 43 are connected by a connection wire to form a continuous winding. Instead, three or more coils may be connected by a connection wire to form a continuous winding.

In the preferred embodiment, the coils 43 are connected in parallel between the first to third bus bars 61 to 63, and the parallel-connected coils 43 are connected in a so-called double delta connection. Instead, the coils 43 may be connected in series in a delta connection without being connected in parallel between the first to third bus bars 61 to 63.

Furthermore, each coil 43 is delta-connected but may be star-connected instead. Such a structure obtains a higher output with the motor 21 under the same conditions compared to when each coil 43 is delta-connected.

In the preferred embodiment, the insulative coating film is removed from predetermined regions at the ends 44 of the conductive wires 42, and the first to third bus bars 61 to 63 are connected to the coils 43 at such regions through resistance welding. Instead, without removing the coating from the ends 44 of the conductive wires 42, fusing may be performed to connect the coils 43 to the first to third bus bars 61 to 63 by melting and integrating the insulative coating film with the ends 44 of the conductive wire 42.

In the preferred embodiment, the stator core 38 includes the plurality of core segments 41. Each core segment 41 is formed by stacking core sheets obtained by punching out a magnetic metal plate. Instead, the stator core 38 may be formed by sintering magnetic powder. Further, the stator core 38 may be formed by a single body instead of being formed from a plurality of core segments 41.

In the preferred embodiment, the main portion 71 of the first bus bar 61 is held in the outer grooves 57b at the basal side and held in the inner grooves 57a at the distal side. Instead, the main portion 71 of the bus bar 62 may be held in the outer grooves 57b at the basal side and held in the inner grooves 57a at the distal side.

In the preferred embodiment, U-phase current is supplied to the first bus bar 61, V-phase current is supplied to the second bus bar 62, and W-phase current is supplied to the third bus bar 63. Instead, U-phase to W-phase currents may be supplied to any one of the first to the third bus bars 61 to 63.

In the preferred embodiment, the stator 33 of the motor 21 includes twelve teeth 40, and twelve coils 43 are wound around the teeth 40 to form concentrated windings. However, the number of the teeth and coils may be changed as required. In this case, the number of the first to third bus bars 61 to 63, and the number of the first connection portions 72 are changed as required in accordance with the number of coils.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A three-phase brushless motor comprising:
a cylindrical housing extending in an axial direction of the motor;
a cylindrical stator arranged in the housing, the stator including a stator core having a plurality of teeth projecting radially inwardly therefrom;
a plurality of coils each wound about an associated one of the teeth and having an end;
an insulator arranged between each tooth and associated coil which electrically insulates the tooth from the associated coil; and
a plurality of bus bars which electrically connect the ends of the plurality of coils supplied with an external current having the same phase;
wherein each of the bus bars includes a main portion and a connection portion, in which the main portion comprises an elongated plate shaped electrically conductive strip having opposed plate surfaces terminating at an edge, wherein the main portion extends in a circumferential direction, and the connection portion is arranged at a predetermined position on the main portion and connected to the end of an associated one of the coils; and
wherein the insulator includes a support which supports at least one of the bus bars in a state in which the main portion of the bus bar is exposed,
wherein the support of the insulator includes a holding slot that extends in the circumferential direction and holds the main portion of the at least one of the bus bars, wherein the slot includes outer grooves and inner grooves, wherein a width of the plate shaped strip in the axial direction of the motor is greater than the depth of the holding slot in the axial direction of the motor, wherein the plate shaped strip extends out from an open distal end of the holding slot in the axial direction of the motor, whereby the bus bar is exposed,
wherein the connection portion of each of the bus bars includes an extension extending from a predetermined position of the main portion in the axial direction of the motor and a holder formed radially inward from the extension, in which the holder has an opening which opens along the circumferential direction, and
wherein the holders of the first and the second bus bars held in the associated outer grooves are located radially inward from the corresponding inner grooves.

2. The brushless motor according to claim 1, wherein:
each of the teeth includes opposite end surfaces facing the axial direction of the motor;
the insulator further includes an end cover and an outer restriction wall, in which the end cover covers one of the end surfaces of the associated tooth, and the outer restriction wall extends in the axial direction at an outer side of the end cover; and
the support extends from the outer restriction wall in the axial direction of the motor.

3. The brushless motor according to claim 1, wherein either one of the main portion and the holding slot includes an engaging projection, and the other of the main portion and the holding slot includes an engaging recess which is engageable with the engaging projection.

4. The brushless motor according to claim 1, wherein:
the main portion includes a stopper inclined at a predetermined angle relative to the axial direction of the motor; and
the holding slot includes a recess which is engageable with the stopper.

5. The brushless motor according to claim 1, wherein the holding slot includes an inner groove formed at a radially inward side and an outer groove formed at a radially outward side, in which the inner and outer grooves are concentric.

6. The brushless motor according to claim 5, wherein:
the plurality of bus bars includes:
a first bus bar having a basal end, which defines a terminal supplied with the external current, and the main portion, which extends from the basal end in the circumferential direction;
a second bus bar having a basal end, which defines a terminal supplied with the external current, and the main portion, which extends from the basal end in a direction opposite the first bus bar; and
a third bus bar having a basal end, which defines a terminal supplied with the external current, and the main portion, which extends from the basal end in the circumferential direction and radially overlaps either one of the first and second bus bars;

the main portion of one of the first and second bus bars includes a basal side and a distal side, in which the main portion is held in the outer groove from the basal side to the distal side;

the main portion of the other of the first and second bus bars includes a basal side and a distal side, in which the basal side is held in the outer groove and the distal side is held in the inner groove; and the main portions of the first and second bus bars are radially overlapped with the main portion of the third bus bar at the basal sides and radially overlapped with each other at the distal sides.

7. The brushless motor according to claim 6, wherein the holders of the first, second, and third bus bars are concentric.

8. The brushless motor according to claim 1, wherein the ends of the coils are welded and connected to the connection portions of the bus bars.

9. The brushless motor according to claim 1, wherein the stator core includes a plurality of core segments aligned along an inner surface of the housing.

10. The brushless motor according to claim 1, wherein the plurality of coils are delta-connected.

11. The brushless motor according to claim 10, wherein the coils are parallel-connected between the bus bars that are supplied with current having the same phase.

12. The brushless motor according to claim 1, wherein the housing is formed from a metal having a high heat conductivity.

13. An electric power steering apparatus comprising:
the brushless motor according to claim 1.

* * * * *